March 26, 1940.  W. H. MILLER  2,195,254
INSULATING MATERIAL CONTAINING MICA
Filed July 8, 1938
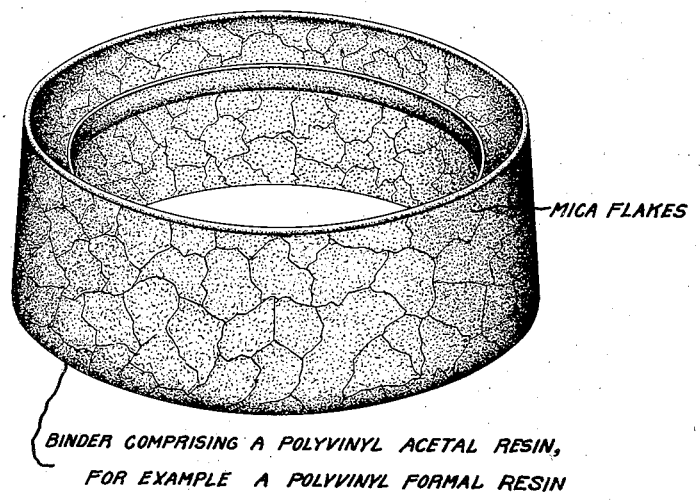
MICA FLAKES
BINDER COMPRISING A POLYVINYL ACETAL RESIN, FOR EXAMPLE A POLYVINYL FORMAL RESIN
Inventor:
William H. Miller,
by Harry E. Dunham
His Attorney.

Patented Mar. 26, 1940

2,195,254

UNITED STATES PATENT OFFICE 2,195,254

INSULATING MATERIAL CONTAINING MICA

William Howard Miller, Fort Wayne, Ind., assignor to General Electric Company, a corporation of New York Application July 8, 1938, Serial No. 218,192

5 Claims. (Cl. 154—2.6)

The present invention relates to composite insulation containing mica and has as its principal object to provide laminated mica structures and articles having improved physical and electrical properties.

In certain applications of electrically insulating substances it is important that the insulation not only have a high dielectric strength but also be capable of withstanding relatively high temperatures and high tensile stress. These properties are indispensable, for example, for the intermediate insulation of commutators, slip rings and the like. For such purposes so-called "pasted mica", that is mica flakes cemented together in stratified relation with a suitable binder, commonly has been used.

It is well known to those engaged in the production of mica articles that adhesives having the particular and peculiar property of wetting and effectively bonding together mica flakes are relatively few in number, probably not more than six or eight such adhesives thus far being known. The binder most commonly used, despite its known disadvantages, has been a natural resin such as shellac. Gum copal also has been employed, as also certain inorganic compositions containing sodium silicate, or lead borate, or compounds of lead, boron and silicon. Certain synthetic resinous materials also are capable of wetting and cementing together mica fragments. One such material is the reaction product of a polyhydric alcohol such as glycerine and a polybasic acid, or the anhydride thereof, such as phthalic acid or anhydride. Such a reaction product is now generally known as an alkyd resin. Laminated articles comprising superposed mica flakes bonded together with an alkyd resin are described in Barringer and Peterson Patent 1,589,094, and the method of making such articles, in Peterson Patent 1,619,758, both of which patents are assigned to the same assignee as the present invention.

The known binders heretofore used or suggested for cementing together mica fragments have certain disadvantages. For example, when shellac-bonded mica is highly heated as an incident to soldering or similar operations in the manufacture of electrical devices, the shellac may sometimes soften sufficiently to permit slipping or sliding of adjacent mica flakes. Shellac also has a tendency to swell when heated. This property often causes deformation in mica structures bonded with shellac, particularly in cases where part of the mica extends beyond the rest of the structure of which it forms a part. Furthermore, products which volatilize from shellac at high temperatures have a tendency to attack copper in electrical devices, particularly in commutators, forming a conductive compound which frequently produces destructive short circuits. With shellac and alkyd resins as binders, considerable time is required in the fabrication of the laminated articles due to the relatively slow rate at which these substances cure or harden. Other bonding agents for mica have been deficient in various respects. Some of these materials decompose at temperatures encountered during operation of electrical machinery, others become brittle, others will not stick to mica effectively throughout the temperature range of service use, and so on.

In accordance with the present invention I produce improved electrically insulating materials by bonding together superposed mica flakes with a cementing agent comprising a resinous composition of the class produced by condensing an aldehyde with a product of hydrolysis of a polyvinyl ester. One embodiment of my invention is illustrated in the accompanying drawing, wherein is shown a mica commutator cone comprising superimposed mica flakes bonded together with the aforementioned resinous compositions used in carrying the present invention into effect. Such resinous compositions are described, generally, in Reissue Patent 20,430, Morrison et al., and, as pointed out in said patent, may be produced from various aldehydes and various polyvinyl esters. In the following description of the invention and in the appended claims, this class of resins is designated, generally, as "polyvinylal resins". A polyvinylal resin may be prepared, for instance, as follows:

One hundred parts of a polymerized vinyl acetate is dissolved in 185 parts of glacial acetic acid. To this is added 83 parts of an aqueous solution of formaldehyde, containing 37½ per cent of formaldehyde, and a suitable amount of mineral acid, for example 6.8 parts of concentrated sulfuric acid. All proportions herein given are by weight. Hydrolysis is carried out at about 70° C. in an enameled vessel. Samples of the reaction mixture are removed at suitable intervals of time and analyzed for their formaldehyde content. The results of analyses indicate the extent to which the polyvinyl ester has been converted into polyvinyl acetal, specifically polyvinyl formal. When the desired degree of conversion has been effected, a suitable amount of a neutralizing agent, for example 13 parts of concentrated ammonia, is added to the reaction vessel. The neutralized mass is poured as a thin stream into water, whereupon the reaction product is precipitated in the form of threads. The thread-like material is washed with water and dried in a current of warm (60° C.) air. The dried threads are white, or nearly so.

Aldehydes other than formaldehyde may be used in making polyvinylal resins, for example, acetaldehyde, propionic aldehyde, butyric aldehyde, benzaldehyde and the like. Likewise polyvinyl esters other than polyvinyl acetate may be employed, for instance polyvinyl propionate, polyvinyl butyrate and the like. The properties of polyvinylal resins may be varied through a wide range by varying the viscosity and the extent of the hydrolysis of the polyvinyl ester, the amount and the character of the aldehyde reacted with the hydrolyzed polymerized vinyl ester, and the character and the amount of acid catalyst used.

Conveniently the polyvinylal resin, modified, if desired, as hereinafter will be described, is applied in solution state to the surface of the mica flakes and is drawn in between the laps of the mica flakes by capillary force. As a solvent for the polyvinylal resin I may use, for example, furfural, ethylene dichloride, dioxan, chloroform, or a mixed solvent formed, for instance, of an aromatic hydrocarbon such as benzene, toluene, or xylene and any one or more of the following monatomic saturated alcohols: methyl, ethyl, n-propyl, n-butyl, n-amyl, hexyl or octyl. The percentage by weight of the alcohol in such a solvent mixture may vary, for instance, from 20 to 40 per cent, the remainder being aromatic hydrocarbon. A more specific example of a suitable solvent is one formed, by weight, of approximately 25 per cent ethyl alcohol and approximately 75 per cent toluene.

The resin solution as applied to the mica flakes may contain any suitable amount of polyvinylal resin, but ordinarily will contain from about 5 to 20 per cent by weight of resin. I have found that a binder formed of a solution containing approximately 10 to 15 per cent by weight of a polyvinylal resin obtained by condensing formaldehyde with a product of hydrolysis of polyvinyl acetate is particularly adapted for wetting and bonding together superposed mica flakes. Only sufficient solution should be used to cause a complete wetting and cementing together of the mica fragments. Ordinarily about 100 parts by weight of a resin solution containing approximately 10 to 15 per cent by weight of polyvinylal resin will effectively wet and bond about 75 to 300 parts by weight of mica. Of course it will be understood that the ratio of binder to mica will vary with such influencing factors as the particular polyvinylal resin and solvent employed, temperature and technique of application, particle size and source of the mica, and so on. In general, it may be said that the amount of binder, calculated on the basis of the solid resin, is less than is required with shellac and other resinous binders heretofore used.

In some cases I may build up the mica plates by superposing dried mica flakes to the required thickness without a binder. The flakes are then bonded together by immersing the plates in the resin solution, thus depending entirely upon the capillary force to distribute the binder. Spraying or any other suitable means of applying the binder to the mica fragments may be employed.

The built-up sheets or plates of mica thus produced are covered on both sides with dry mica to prevents sticking to the supports and are placed in an evacuated oven heated to a temperature sufficiently high to volatilize the solvent. This temperature may range, for instance, from 110° to 150° C., depending upon the particular solvent employed. The mass is allowed to remain in the oven for a period of time varying with conditions, but ordinarily will be from about 30 minutes to two hours. During this preliminary heating step the solvent is thoroughly removed.

The mica plates are then placed between cushions in a hydraulic press as described in Peterson Patent 1,098,967. After the temperature has become equalized by turning on the steam used for heating the press for about 15 minutes, the mica plate is compressed under a pressure of about 500 to 1000 pounds per square inch while simultaneously heating the same to a temperature of about 150 to 175° C. The hydraulic pressure should be released several times during the first five to ten minutes to allow the escape of volatile ingredients in the sheets. When no more vapors are being given off, full pressure of about 1000 pounds per square inch is applied continuously to the mica sheets for about 45 minutes.

The sheets thus produced are milled to equalize the thickness. Thereafter they are cut or sawed to produce developed shapes that later can be molded into cones for the commutators of dynamo-electric machines or into other desired articles.

After the developed shapes have been preformed they are placed into a mold, and heated to approximately 150° to 200° C., while simultaneously applying pressure to give the articles the desired form. During this molding treatment, which requires only a few minutes, the initially thermoplastic and relatively soft polyvinylal resin is converted to a hard, flexible, tough, abrasion-resistant state. In this form the resinous binder is resistant to the softening action of solvents such as oils, varnishes, and the like. It has good moisture resistance and high dielectric strength. Further, it does not readily oxidize and become brittle when heated for long periods of time. It softens slightly at high temperature, but not sufficiently that it oozes from between the mica flakes and permits sliding of the flakes when under pressure. This softening of the binder at an elevated temperature is particularly advantageous in the assembling of mica cones in commutators, since it is impracticable to form the metal and mica parts of the commutator to exact dimensions. Hence when mica cones, such as shown by way of illustration in the accompanying drawing, are assembled with the other parts of the commutator and heated to a temperature of about 150 to 200° C. under pressure, the binder will yield sufficiently to cause the mica to assume a snug mechanical fit with respect to the adjoining metal parts without cracking.

For certain applications it is advantageous to modify the polyvinylal resin by incorporating therewith, prior to use, a suitable proportion, for example up to 50 per cent, preferably from about 5 to 40 per cent, of a potentially reactive synthetic resin. Examples of such resins are those known, generally, as phenol-aldehyde, urea-aldehyde, aniline-aldehyde resins, and the like. A resinous condensation product of a phenol, more particularly cresol, and formaldehyde is a preferred modifying agent.

The potentially reactive resin is converted to an insoluble and infusible state while forming the mica plate under heat and pressure, or during subsequent service use of the material. The presence of such heat-resisting resin in the binder serves to increase the resistance to flow of the polyvinylal resin at the elevated temperatures encountered during use of the insulation in electrical apparatus, without materially affecting the high dielectric strength and wetting power toward mica of the polyvinylal resin. Other addition materials also may be incorporated in the resinous binder, as desired or as conditions may require.

The mica products of this invention are oil- and moisture-resistant, have good arc resistance, a high dielectric strength and, in general, can be made with less binder than has been required heretofore for the manufacture of such products. The new products can be made in varying flexibility to meet particular installation requirements, and thus facilitate the construction of various types of electrical apparatus. Commutator segments and cones made of mica flakes pasted with polyvinylal resin are exceptionally firm and strong. Small motor commutators in which such pasted mica was used were spun hot at high speed. The mica flakes showed no tendency to slip and the resin binder did not ooze from the pasted mass.

Unlike shellac, the polyvinylal resin binder shows no tendency to form harmful decomposition products at temperatures encountered during operation of electrical machinery. The binder is not attacked by such solvent agencies as alcohols, acetone, naphthas and other common solvents as is shellac. In brief, the polyvinylal resin fulfills all the exacting conditions requisite for a bonding agent for mica flakes from the standpoint of both physical and electrical properties. As a result, laminated mica compositions of superior quality and a wide field of utility are produced.

What I claim as new and desire to secure by Letters Patent of the United States, is:

1. An electrically insulating material comprising fragments of mica bonded together with a cementing agent comprising a polyvinylal resin.

2. A laminated insulating composition consisting of flakes of mica superposed upon each other and bound together with a cementing agent comprising a polyvinylal resin modified with a potentially reactive resin converted to the insoluble and infusible state by heating under pressure.

3. An electrically insulating material comprising fragments of mica superposed upon each other and cemented together with a binding medium comprising a polyvinylal resin obtained by condensing formaldehyde with a product of hydrolysis of polyvinyl acetate.

4. A laminated article consisting substantially of flakes of mica bonded together with a cementing agent comprising a polyvinylal resin modified with a phenolaldehyde resin in an insoluble and infusible state.

5. An electrically insulating material consisting of fragments of mica bonded together with a cementing agent comprising a polyvinylal resin modified with from 5 to 40 per cent by weight thereof of a phenol-formaldehyde resin in an insoluble and infusible state, said polyvinylal resin being obtained by condensing formaldehyde with a product of hydrolysis of polyvinyl ester.

WILLIAM HOWARD MILLER.